May 17, 1966  IKUYA NODA  3,251,213
METHOD OF MANUFACTURING H-BEAMS
Filed Oct. 26, 1962  5 Sheets-Sheet 1

FIG. I.

*Ikuya Noda,*
INVENTOR.
BY *Wenderoth,*
*Lind and Ponack, attorneys*

May 17, 1966     IKUYA NODA     3,251,213
METHOD OF MANUFACTURING H-BEAMS

Filed Oct. 26, 1962     5 Sheets-Sheet 2

INVENTOR.

May 17, 1966      IKUYA NODA      3,251,213

METHOD OF MANUFACTURING H-BEAMS

Filed Oct. 26, 1962      5 Sheets-Sheet 5

Ikuya Noda,
INVENTOR.

BY Wenderoth,
Lind and Ponack, Attorneys

United States Patent Office 3,251,213
Patented May 17, 1966

3,251,213
METHOD OF MANUFACTURING H-BEAMS
Ikuya Noda, Himeji-shi, Hyogo-ken, Japan, assignor to
Fuji Iron & Steel Company Ltd., Tokyo, Japan
Filed Oct. 26, 1962, Ser. No. 233,316
Claims priority, application Japan, Nov. 22, 1961,
36/42,571
3 Claims. (Cl. 72—225)

This invention relates to an apparatus for manufacturing H-beams, wherein H-beams, I-beams or modified H-beams are rolled in the hot state with high efficiency from such materials as ordinary soft carbon steel, high-tensile strength carbon steel, low-alloy high-tensile strength steel, anti-corrosive high tensile strength steel etc., and H-beams, I-beams or modified H-beams can be advantageously manufactured from materials having high rolling resistance, or H-beams, I-beams, or modified H-beams which are extremely thin can be advantageously manufactured.

As used herein, the terms H-beam, I-beam or modified H-beam mean those steel beams having those shapes and having dimensions for web height of 100 to 1000 mm. web thickness of 4 to 50 mm. flange with 50 to 450 mm. and a flange thickness of 5.5 to 75 mm. All of these shapes will hereinafter be collectively referred to as H-beams.

In the usual process of manufacturing H-beams, there is provided a universal rolling mill having horizontal and vertical rolls in substantially the same plane, and a flange edge rolling mill adjacent thereto, said mills composing a group of reversible roughing mills. A plurality of such reversible roughing mill groups can be arranged in such spaced positions that the steel material being rolled will never extend over more than two groups at the same time. Finishing mills are arranged at a suitable distance from the last such group of roughing mills. Alternatively two-high or three-high rolling mill groups having caliber rolls instead of such reversible universal roughing mill group can be used to work hot rolled steel materials which have been subjected to adequate primary rolling operations.

However, in all of these processes, the steel material will never receive an effective draft in one rolling pass through more than two sets of roughing universal mills at the same time, and because of the long distances between roughing mill groups, it takes a long time to convey the steel material. This results in long times for carrying out the rough rolling process which in turn causes a temperature drop of the steel materials and a corresponding increase in the rolling resistance. This limits rolling efficiency, and difficulties are involved in the manufacture of H-beams, especially H-beam having extremely thin parts, from materials having high rolling resistance.

It is an object of the present invention to provide a method and apparatus for efficiently rolling H-beams, even from material having high rolling resistance.

Other objects as well as the novel features and advantages of the present invention will be more fully understood when the following description is read in light of the accompanying drawings, in which.

Figure 1:
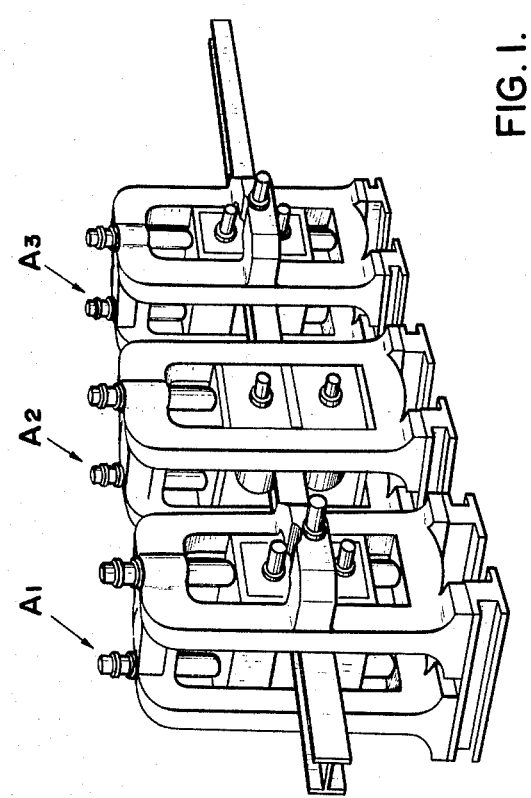
FIG. 1 is a perspective view showing a roughing mill group according to the present invention.
Figure 2:
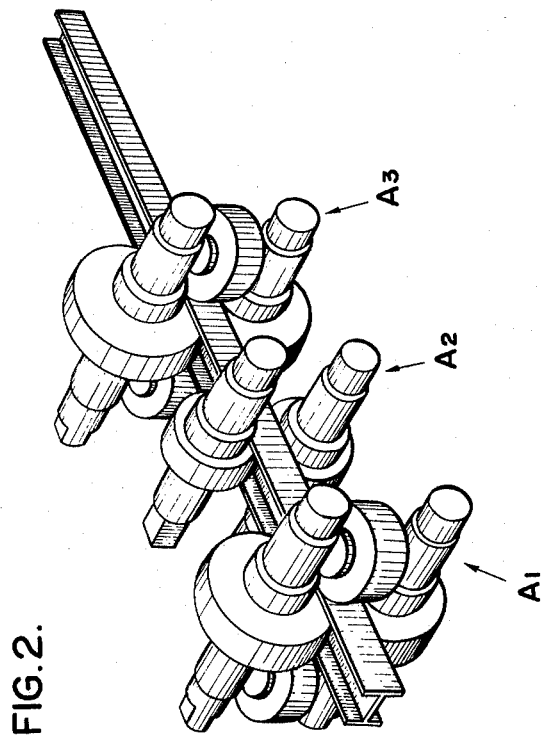
FIG. 2 is a perspective view illustrating the essential rollers of the mill of the present invention.

The present invention relates to an H-beam manufacturing apparatus for eliminating the above mentioned difficulties of rolling mills by the arrangement shown as FIG. 1, whereas an edging roll stand $A_2$ having opposed horizontal edging rolls C and C' (see FIG. 6) substantially midway between two sets of reversible universal roughing roll stands $A_1$, $A_3$ and 3 roll stands are positioned adjacent to each other in tandem so that the materials to be rolled can be passed through all three roll stands simultaneously, the group of roll stands thus forming one unit which can be part of a series of reversible roughing mill groups. As shown in FIG. 2 each unit in the series of reversible roughing mill groups will carry out high efficiency rolling by simultaneous action on a workpiece which is passed through the roll stands of the unit first in one direction and then in the opposite direction. There can be manufactured from H-beam blanks having H-beams extremely thin sections or beams of materials having high rolling resistance.

Figure 3:
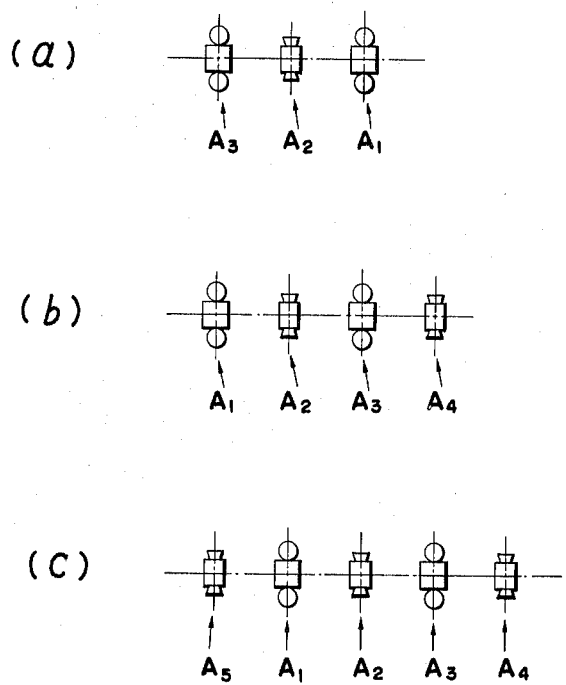
FIGS. 3a, 3b and 3c are schematic views of various reversible roughing mill groups according to the present invention.

In FIG. 3, above description is of the arrangement, (a); however, an arrangement (b) having an additional roll stand $A_4$ of horizontal edging rolls after the second universal roll stand A, or another arrangement (c) having two additional roll stands $A_4$ and $A_5$ of horizontal edging rolls, one preceding and the other following the roll stands $A_1$, $A_3$ and $A_2$ can be used to form reversible roughing mill groups, wherein the first pass is facilitated in order of the arrangements (a), (b) and (c) and the shapes of the flange edges can be made more precisely.

As the universal roughing mills of the present invention, there can be used any of the common types now in use, for instance, open top type, closed top type, setup housing type, inner cartridge type, cross bar type, vertical roll driving type, vertical roll non-driving type, vertical roll type with back up rolls, etc.

And as the edging roll stands there can be used any of the common types now in use, for instance, open top type, closed top type, inner cartridge type, cross bar type, movable housing type, setup housing type, etc.

Figure 4:
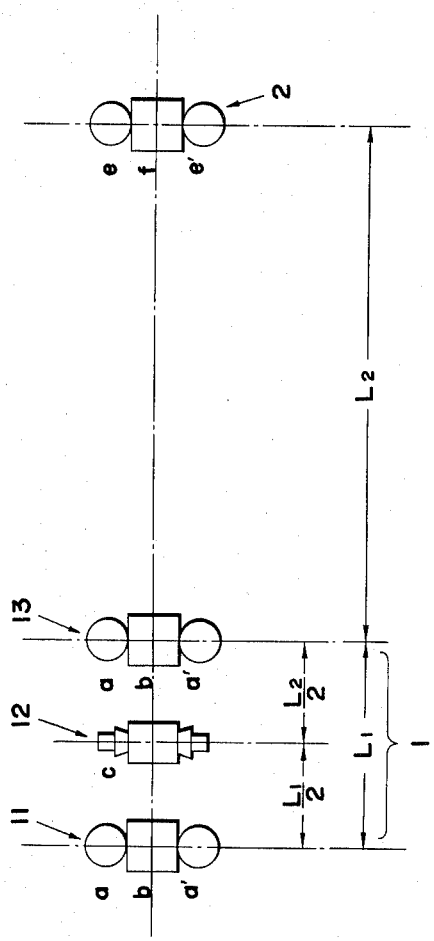
FIG. 4 is a schematic plan view illustrating an embodiment of the present invention.

In FIG. 4, (1) is a reversible unit roughing mill group, 2 is a finishing mill, 11 is a first roughing universal roll stand, 12 is a horizontal edging roll stand, 13 is a second roughing universal roll stand, $a$ and $a'$ are the vertical rolls and $b$ and $b'$ are the horizontal rolls of the universal roll stand, $c$ is the top horizontal edging roll of the edging roll stand, $L_1$ is the distance between center lines of the first roughing universal roll stand and the second roughing universal roll stand, which distance is, for example, 8,840 mm., and $L_2$ is the distance between the center line of the second roughing universal roll stand and the finishing mill, which distance is, for example, 92,855 mm. $L_1$ is made sufficiently small compared with the length of the steel beam to be rolled and $L_2$ is made sufficiently large compared with the finished length of the steel beam, about 80,000 mm. that in the reversible unit roughing mill group 1, the materials to be rolled is acted on simultaneously by all three roll stands, whereas the finishing mill 2 is spaced sufficiently from the roughing roll stands that preceding materials which have been rough rolled can be finished independently.

Figure 5:
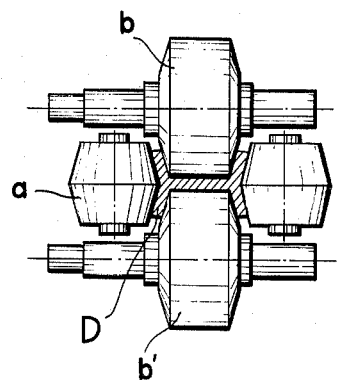
FIG. 5 is an elevation view showing the rolls rolling an H-beam in a roughing universal rolling mill.

FIG. 5 is an elevation showing the construction of said universal roughing roll stands 11 and 13 of FIG. 4, wherein $a$ and $a'$ are vertical rolls (having a maximum diameter of 1067 mm. and a minimum diameter of 991 mm. for example), and $b$ and $b'$ are horizontal rolls (the maximum diameter being 1,373 mm. and the minimum diameter being 1,270 mm. for example) and all center lines of these rolls lie in substantially the same plane. The cross section of the steel material D being rolled by each roll stand is shown in section.

Figure 6:
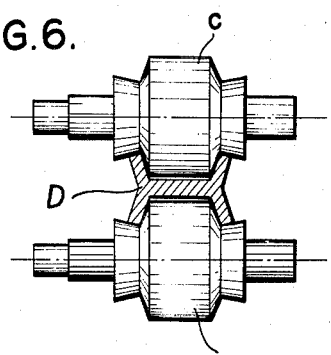
FIG. 6 is an elevation view showing the rolls rolling an H-beam in a flange edge roughing mill.

FIG. 6 is an elevation showing the construction of said edge roll stand 12 of FIG. 4, wherein $c$ and $c'$ are horizontal edge rolls (the maximum diameter of the roll being 1,168 mm. and the minimum diameter being 1,092 mm. for example). The cross section of the steel material D being rolled is shown in section.

Figure 7:
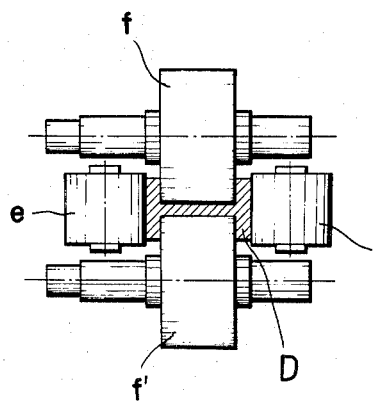
FIG. 7 is an elevation view showing the rolls rolling an H-beam in a universal finishing mill.

FIG. 7 shows one example of said universal finishing mill 2 of FIG. 4, wherein $e$ and $e'$ are vertical rolls (the maximum diameter being 940 mm. for example), $f$ and $f'$ are horizontal rolls (the maximum diameter of the roll being 1,295 mm. and the minimum diameter being 1,194 mm. for example). The cross section of the steel material D being rolled is shown in section.

As mentioned above, in the present invention the distance ($L_1$) between the first universal rolling mill and the second universal rolling mill is made small enough so that the entire length of the material being rolled can be passed through the group of three mills, the two reversible roughing mills and the flange edge rolling mill placed between them. The group of mills thus forms a reversible roughing mill unit which in a single rolling pass achieves an effective draft of the steel material being rolled which is equivalent to that achieved in a plurality of rolling passes in the conventional rough rolling mill systems. In addition, the loss of time incurred in transporting the steel material between conventional roughing mills is avoided in the present invention and the required draft of the material is achieved in a relatively short time as compared with the time required in the conventional system. It is therefore possible to obtain a high rolling efficiency.

Moreover, the increased rolling resistance of the steel material which takes place with the temperature drop in the material being rolled is not as great in the present invention as in the conventional system, due to the shorter time in which an equivalent reduction of the material can be obtained. Thus, with the apparatus and method of the present invention, it is possible to roll H-beams with a thinner cross section, both of the flanges and the webs, than with conventional methods, and the rolling of thin cross section beams is easier than with the conventional methods.

In addition, in the conventional methods, the quality and shape of the products can be improved by adequately tensioning the material being rolled. The apparatus of the present invention can be operated to give such a tension to the material being rolled very easily and in a full range from zero tension to an adequate tension, both for improving the quality of the material as well as increasing the productivity.

Further, a plurality of roughing mill units according to the present invention can be used if necessary. The groups can be arranged in series, in parallel, or in combinations of series and parallel, depending on the amount of production required, the size of the H-beams to be rolled, and the like.

Having thus described the invention, what is claimed as new and desired to be secured by Letters Patent is:

1. A method of rough rolling flanged shapes having web and flange portions in a reversible roughing mill group of roll stands having only two universal roll stands and a horizontal edging roll stand between said universal roll stands with the universal roll stands being spaced from each other a distance less than the length of the shape to be rolled, said method consisting essentially of the steps of first passing a blank successively through the first universal roll stand, the edging roll stand and the second universal roll stand in one direction with the three roll stands acting simultaneously on the blank during part of the passage of the blank through the roll stands, the web and flange portions of the blank being reduced by the universal roll stands and the flange edges being rolled by the edging roll stand, and passing the thus rolled blank back through the group of roll stands in the opposite direction, and repeating the back and forth passage of the blank for rolling the rough flanged shape.

2. A method as claimed in claim 1 further comprising the step of finish rolling the rough rolled flanged shape in a finishing universal mill after the last passage of the rough rolled shape through said group of roll stands.

3. A method of rough rolling flanged shapes having web and flange portions in a reversible roughing mill group of roll stands having only two universal roll stands and a horizontal edging roll stand between said universal roll stands with the universal roll stands being spaced from each other a distance less than the length of the shape to be rolled, said method consisting essentially of the steps of first passing a blank successively through the first universal roll stand, the edging roll stand, and the second universal roll stand in one direction with the three roll stands acting simultaneously on the blank during part of the passage of the blank through the roll stands, the web and flange portions of the blank being reduced by the universal roll stands and the flange edges being rolled by the edging roll stand, and passing the thus rolled blank back through the group of roll stands in the opposite direction, and repeating the back and forth passage of the blank for rolling the rough flanged shape while applying tension to the blank during the passage between the reversing universal roll stands.

References Cited by the Examiner

UNITED STATES PATENTS

| | | | |
|---|---|---|---|
| 1,025,078 | 4/1912 | Vassen | 80—66 |
| 1,812,246 | 6/1931 | Oberg | 80—66 |
| 3,165,948 | 1/1965 | Kishikawa | 80—66 |

CHARLES W. LANHAM, *Primary Examiner.*

WILLIAM J. STEPHENSON, *Examiner.*

C. H. HITTSON, R. J. HERBST, *Assistant Examiners.*